US009578519B2

(12) United States Patent
Jaldén et al.

(10) Patent No.: US 9,578,519 B2
(45) Date of Patent: Feb. 21, 2017

(54) ANTENNA SETTINGS IN WIRELESS COMMUNICATIONS NETWORKS

(71) Applicant: Telefonaktiebolaget L M Ericsson (PUBL), Stockholm (SE)

(72) Inventors: Niklas Jaldén, Enköping (SE); Henrik Asplund, Stockholm (SE); Harald Kallin, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/764,544

(22) PCT Filed: Jul. 22, 2015

(86) PCT No.: PCT/EP2015/066792
§ 371 (c)(1),
(2) Date: Jul. 29, 2015

(65) Prior Publication Data
US 2017/0026852 A1 Jan. 26, 2017

(51) Int. Cl.
*H04W 16/28* (2009.01)
*H01Q 3/00* (2006.01)
*H04W 88/08* (2009.01)

(52) U.S. Cl.
CPC ............ *H04W 16/28* (2013.01); *H01Q 3/005* (2013.01); *H04W 88/08* (2013.01)

(58) Field of Classification Search
CPC ..... H04W 16/28; H04W 24/02; H04W 48/00; H04W 72/04; H04W 72/0453;
(Continued)

(56) References Cited

U.S. PATENT DOCUMENTS

2007/0258411 A1* 11/2007 Trigui ................. H01Q 3/2611
370/335
2011/0009105 A1 1/2011 Lee et al.
(Continued)

FOREIGN PATENT DOCUMENTS

EP   2621208 A1   7/2013
EP   2621210 A1   7/2013
(Continued)

OTHER PUBLICATIONS

International Search Report and the Written Opinion of the International Searching Authority, issued in corresponding International Application No. PCT/EP2015/066792, dated Mar. 15, 2016, 11 pages.

*Primary Examiner* — Golam Sorowar
(74) *Attorney, Agent, or Firm* — Rothwell, Figg, Ernst & Manbeck, P.C.

(57) ABSTRACT

There is provided mechanisms for determining antenna settings associated with at least one network node in a wireless communications network. A method is performed by a network node. The method comprises detecting an event of a network node in the wireless communications network, the event indicating a need for adjustment of at least one antenna setting of the network node and/or at least one other network node in the wireless communications network. The method comprises determining the adjustment of the at least one antenna setting by identifying stored key performance information based on the event. The method comprises determining the adjustment of the at least one antenna setting by assessing a candidate set of possible antenna settings of the network node and/or the at least one other network node, wherein the candidate set is defined by the key performance information.

19 Claims, 6 Drawing Sheets

(58) Field of Classification Search
CPC ........... H04W 72/048; H04W 74/0866; H04W 24/00; H04W 36/08; H04W 36/32; H04W 36/38; H04W 72/046; H04W 88/085; H04W 28/02; H04W 88/08; H04B 7/0617; H04B 17/12; H04B 7/0682; H04B 17/101; H04B 17/102; H04B 17/103; H04B 17/14; H04B 17/17; H04B 17/18; H04B 17/23; H04B 17/309; H04B 7/0408; H04B 7/063; H04B 7/0639; H04B 7/0842; H04B 7/0695

See application file for complete search history.

(56) References Cited

U.S. PATENT DOCUMENTS

| | | | | |
|---|---|---|---|---|
| 2011/0143746 A1* | 6/2011 | Lehser | ................. | H04W 24/02 455/423 |
| 2012/0004001 A1* | 1/2012 | Power | ................... | H04W 24/02 455/507 |
| 2013/0324076 A1* | 12/2013 | Harrang | ............... | H04W 28/08 455/405 |

FOREIGN PATENT DOCUMENTS

| | | |
|---|---|---|
| WO | 2016055092 A1 | 4/2016 |
| WO | 2016096001 A1 | 6/2016 |

\* cited by examiner

ANTENNA SETTINGS IN WIRELESS COMMUNICATIONS NETWORKS

CROSS REFERENCE TO RELATED APPLICATION(S)

This application is a 35 U.S.C. §371 National Phase Entry Application from PCT/EP2015/066792, filed Jul. 22, 2015, designating the United States, the disclosure of which is incorporated herein in its entirety by reference.

TECHNICAL FIELD

Embodiments presented herein relate to wireless communications network, and particularly to a method, a network node, a computer program, and a computer program product for determining antenna settings in a wireless communications network.

BACKGROUND

In communications networks, there may be a challenge to obtain good performance and capacity for a given communications protocol, its parameters and the physical environment in which the communications network is deployed.

For example, reconfigurable antenna systems (RAS) are increasingly used in wireless cellular networks to improve the network operation and communication quality. One common variant of RAS is antenna tilting which is applied to balance the coverage of a sector antenna with the interference generated to and received from neighboring cells. An antenna pattern can be tilted mechanically or electrically, by local input or using remote control. More advanced antenna pattern shaping is becoming feasible with the introduction of active antennas having integrated radio frequency functionality. For example, the beam width or sidelobe levels may be adjusted by changing the excitation of individual antenna elements within an antenna array.

In order to tune the RAS settings of many antennas and cells in a network, different automated algorithms may be applied. These algorithms are commonly denoted as RAS-SON algorithms, where SON is short for self-organizing network or self-optimizing network. Due to the complexity of predicting the network response to a considered RAS change, it is common to test the new settings and observe the changes in network behavior, and then decide, based on the performance changes, whether to keep the new settings or revert back to the original settings. Typically, a conservative approach is required in order not to have too large or too frequent performance drops by using non-optimal settings. Another mechanism to achieve a stable working network involves collecting network behavior statistics or Key Performance Indicators (KPIs) for significant time periods in order to gain confidence that the new settings indeed provide improved performance.

RAS-SON algorithms as outlined below are ill-suited to cope with rapid changes in the network. One particular case of a rapid change in the network is the loss of a cell due to e.g. power outage. When such an outage occurs, the network needs to readjust its RAS settings quickly to mitigate, or even avoid, service loss, which is contradicting to the slow and conservative approach outlined above.

Hence, there is still a need for an improved determination of antenna settings in a wireless communications network.

SUMMARY

An object of embodiments herein is to provide efficient determination of antenna settings in a wireless communications network.

According to a first aspect there is presented a method for determining antenna setting associated with at least one network node in a wireless communications network. The method is performed by a network node. The method comprises detecting an event of a network node in the wireless communications network, the event indicating a need for adjustment of at least one antenna setting of said network node and/or at least one other network node in the wireless communications network. The method comprises determining said adjustment of said at least one antenna setting by identifying stored key performance information based on the event. The method comprises determining said adjustment of said at least one antenna setting by assessing a candidate set of possible antenna settings of said network node and/or said at least one other network node, wherein the candidate set is defined by the key performance information. The method comprises determining said adjustment of said at least one antenna setting by selecting one entry of antenna settings in the candidate set based on said assessing, said one entry defining said adjustment, to be the determined antenna setting.

Advantageously this provides efficient determination of antenna settings in a wireless communications network.

Advantageously this enables quick reconfiguration of the network to mitigate e.g. cell outages, thereby reducing the duration and severity of a service loss.

According to a second aspect there is presented a network node for determining antenna setting associated with at least one network node. The network node comprises processing circuitry. The processing circuitry is configured to cause the network node to perform a set of operations. The processing circuitry is configured to cause the network node to detect an event of a network node in the wireless communications network, the event indicating a need for adjustment of at least one antenna setting of said network node and/or at least one other network node in the wireless communications network. The processing circuitry is configured to cause the network node to determine said adjustment of said at least one antenna setting. The processing circuitry is configured to cause the network node to determine said adjustment of said at least one antenna setting by identifying stored key performance information based on the event. The processing circuitry is configured to cause the network node to determine said adjustment of said at least one antenna setting by assessing a candidate set of possible antenna settings of said network node and/or said at least one other network node, wherein the candidate set is defined by the key performance information. The processing circuitry is configured to cause the network node to determine said adjustment of said at least one antenna setting by selecting one entry of antenna settings in the candidate set based on said assessing, said one entry defining said adjustment, to be the determined antenna setting.

According to a third aspect there is presented a computer program for determining antenna setting associated with at least one network node, the computer program comprising computer program code which, when run on a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
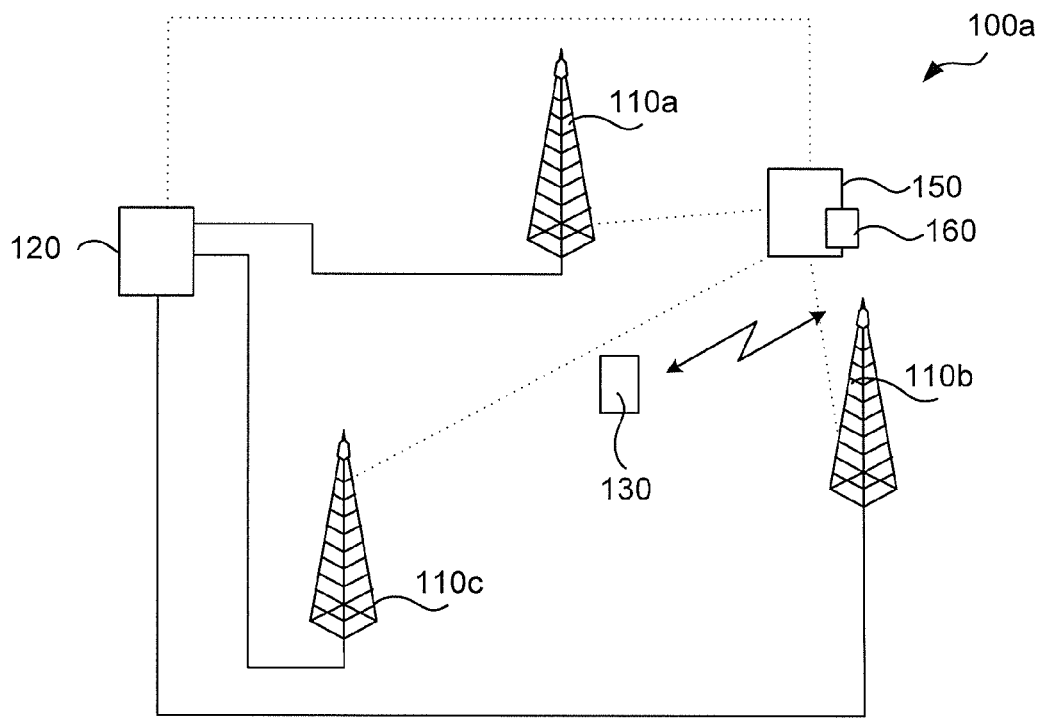
FIGS. 1a and 1b are schematic diagrams illustrating communications networks according to embodiments.

FIG. 1a is a schematic diagram illustrating a communications network 100a where embodiments presented herein can be applied. The communications network 100a comprises radio access network (RAN) nodes 110a, 110b 110c. The RANNs 110a, 110b 110c may be any combination of radio base stations such as base transceiver stations, node Bs, and/or evolved node Bs. The RANNs 110a, 110b 110c may further be any combination of macro RANNs, and micro, or pico, RANNs. Each RANN 110a, 110b, 110c provides network coverage in a respective coverage region (see, FIG. 113) by transmitting transmission beams in that coverage region. Each such coverage region forms a cell. Hence, the wireless communications network 100a, may regarded as a cellular wireless communications network. Each RANN 110a, 110b 110c is assumed to be operatively connected to a core network, as exemplified by one central network node 150. In some embodiments the central network node 150 is radio network controller (RNC). The central network node 150 may comprise, or be operatively connected to, a database 160. The database 160 may store key performance information. The core network may in turn be operatively connected to a service and data providing wide area network. The RANNs 110a, 110b 110c may further be operatively connected to a network node 120. The network node 120, which may be a centralized network node, will be further disclosed below.

Hence, a wireless device 130 served by one of the RANNs 110a, 110b, 110b may thereby access services and data as provided by the wide area network. The wireless devices 130 may be any combination of mobile stations, mobile phones, handsets, wireless local loop phones, user equipment (UE), smartphones, laptop computers, tablet computers, sensor devices, and/or modems.

Figure 1B:
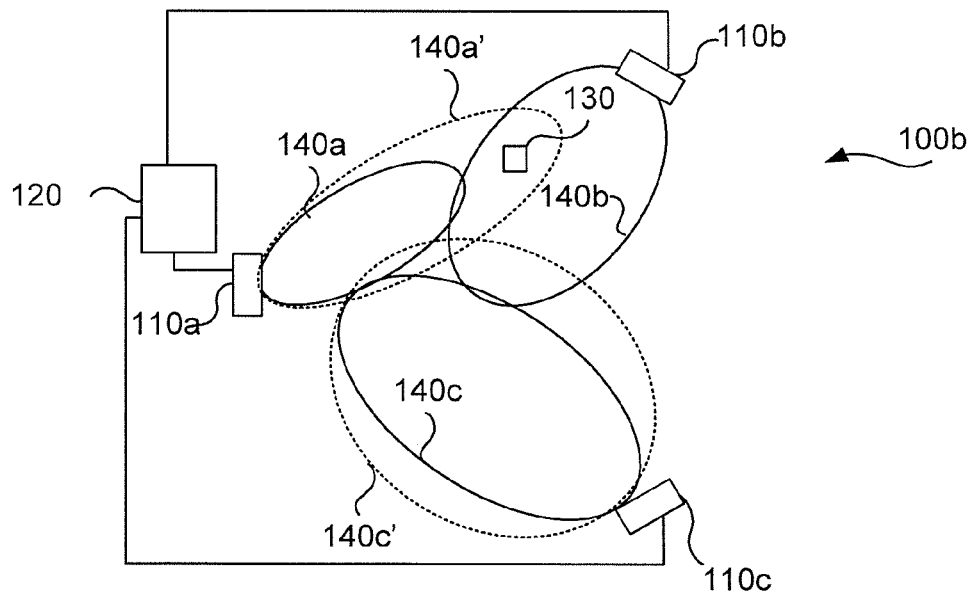

Further, in the illustrative example of FIG. 1b the coverage regions, or cells 140a, 140b, 140c of each RANN 110a, 110b, 110c have been schematically illustrated. Each cell 140a, 140b, 140c can be shaped by applying beam forming parameters at the RANNs 110a, 110b, 110c.

As noted above, by applying such beam forming, the radiation pattern of the antenna at a RANN 110a, 110b, 110c may be controlled by transmitting a signal from a plurality of elements with an element specific gain and phase. In this way, radiation patterns with different pointing directions and transmission and/or reception beam widths in both elevation and azimuth directions may be created. For example, cell 140a may be reshaped as cell 140a', and cell 140c may be reshaped as cell 140c'.

As also noted above, there is still a need for an efficient determination of antenna settings in a wireless communications network 100a, 100b. There are several ways in which candidate cell shaping weights can be determined. One way is to try different beam forming weights, for example corresponding to an increase or decrease of the current tilt in one or several cells. Then, the network performance may be observed and settings that are good may be kept. The procedure may then be repeated for the kept settings. However, when the weights are changed, undesired coverage holes may be created, and the length of the measurement period to get reliable statistics is uncertain.

At least some of the embodiments disclosed herein concerns creating a database comprising information on how well certain antenna settings worked in the wireless communications network 100a, 100b. No active antenna arrays are required, and hence the herein disclosed embodiments are applicable for existing networks without changing the installed sites.

The embodiments disclosed herein particularly relate to mechanisms for determining antenna setting associated with at least one network node 110a, 110b, 110c in a wireless communications network 100a, 100b. In order to obtain such mechanisms there is provided a network node 110a, 110b, 110c, 120, a method performed by the network node 110a, 110b, 110c, 120, a computer program comprising code, for example in the form of a computer program product, that when run on a network node 110a, 110b, 110c, 120, causes the network node 110a, 110b, 110c, 120 to perform the method.

Figure 2A:
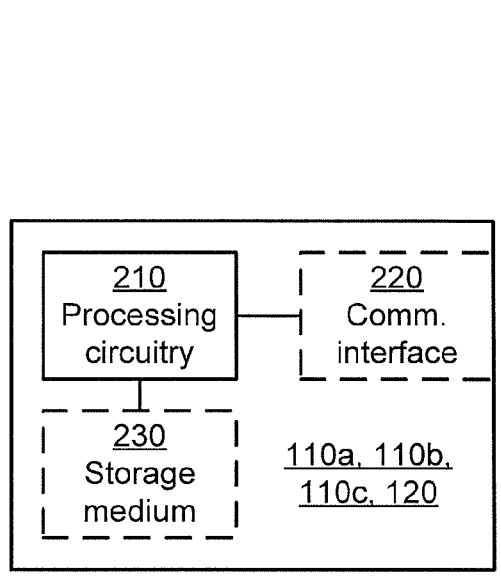
FIG. 2a is a schematic diagram showing functional units of a network node according to an embodiment.

FIG. 2a schematically illustrates, in terms of a number of functional units, the components of a network node 110a, 110b, 110c, 120 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310 (as in FIG. 3), e.g. in the form of a storage medium 230.

Particularly, the processing circuitry 210 is configured to cause the network node 110a, 110b, 110c, 120 to perform a set of operations, or steps, S102-S110. These operations, or steps, S102-S110 will be disclosed below. For example, the storage medium 230 may store the set of operations, and the processing circuitry 210 may be configured to retrieve the set of operations from the storage medium 230 to cause the network node 110a, 110b, 110c, 120 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 110a, 110b, 110c, 120 may further comprise a communications interface 220 for communications with at least one other network node 110a, 110b, 110c, 120 and for providing network services to wireless devices 130 within a cell 140a, 140a' 140b, 140c, 140c'. As such the communications interface 220 may comprise one or more transmitters and receivers, comprising analogue and digital components.

The processing circuitry 210 controls the general operation of the network node 110a, 110b, 110c, 120 e.g. by sending data and control signals to the communications interface 220 and the storage medium 230, by receiving data and reports from the communications interface 220, and by retrieving data and instructions from the storage medium 230. Other components, as well as the related functionality, of the network node 110a, 110b, 110c, 120 are omitted in order not to obscure the concepts presented herein.

Figure 2B:
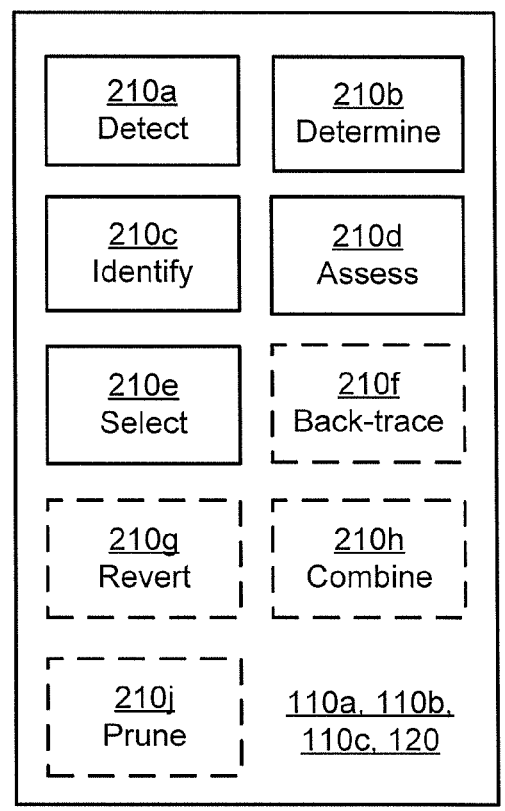
FIG. 2b is a schematic diagram showing functional modules of a network node according to an embodiment.

FIG. 2b schematically illustrates, in terms of a number of functional modules, the components of a network node 110a, 110b, 110c, 120 according to an embodiment. The network node 110a, 110b, 110c, 120 of FIG. 2b comprises a number of functional modules; a detect module 210a configured to perform below steps S102, S106, a determine module 210b configured to perform below steps S104, S108, an identify module 210c configured to perform below step S104a, an assess module 210d configured to perform below step S104c, and a select module 210e configured to perform below step S104d. The network node 110a, 110b, 110c, 120 of FIG. 2b may further comprises a number of optional functional modules, such as any of a back-trace module 210f configured to perform below step S104b, a revert module 210g configured to perform below step S108a, a combine module 210h configured to perform below step S108b, and a prune module 210j configured to perform below step S110. The functionality of each functional module 210a-210h will be further disclosed below in the context of which the functional modules 210a-210h may be used. In general terms, each functional module 210a-210h may be implemented in hardware or in software. Preferably, one or more or all functional modules 210a-210h may be implemented by the processing circuitry 210, possibly in cooperation with functional units 220 and/or 230. The processing circuitry 210 may thus be arranged to from the storage medium 230 fetch instructions as provided by a functional module 210a-210h and to execute these instructions, thereby performing any steps as will be disclosed hereinafter.

The network node 110a, 110b, 110c, 120 may be provided as a standalone device or as a part of a further device. For example, the network node 110a, 110b, 110c, 120 may be provided in a radio access network node 110a, 110b, 110c, and/or in a central management node 120. Alternatively, functionality of the network node 110a, 110b, 110c, 120 may be distributed between at least two devices, or nodes. These at least two nodes, or devices, may either be part of the same network part (such as a radio access network or a core network) or may be spread between at least two such network parts. In general terms, instructions that are required to be performed in real time may be performed in a device, or node, operatively closer to the cells 140a, 140a' 140b, 140c, 140c' than instructions that are not required to be performed in real time. In this respect, at least part of the network node 110a, 110b, 110c, 120 may reside in the radio access network, such as in a radio access network node 110a, 110b, 110c for cases when embodiments as disclosed herein are performed in real time.

Thus, a first portion of the instructions performed by the network node 110a, 110b, 110c, 120 may be executed in a first device, and a second portion of the of the instructions performed by the network node 110a, 110b, 110c, 120 may be executed in a second device; the herein disclosed embodiments are not limited to any particular number of devices on which the instructions performed by the network node 110a, 110b, 110c, 120 may be executed. Hence, the methods according to the herein disclosed embodiments are suitable to be performed by a network node 110a, 110b, 110c, 120 residing in a cloud computational environment. Therefore, although a single instance of a processing circuitry 210 is illustrated in FIG. 2a the processing circuitry 210 may be distributed among a plurality of devices, or node. The same applies to the functional modules 210a-210h of FIG. 2b and the computer program 320 of FIG. 3 (see below).

Figure 3:
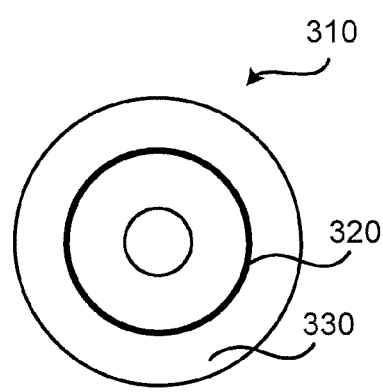
FIG. 3 shows one example of a computer program product comprising computer readable means according to an embodiment.

FIG. 3 shows one example of a computer program product 310 comprising computer readable means 330. On this computer readable means 330, a computer program 320 can be stored, which computer program 320 can cause the processing circuitry 21 and thereto operatively coupled entities and devices, such as the communications interface 22 and the storage medium 23, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
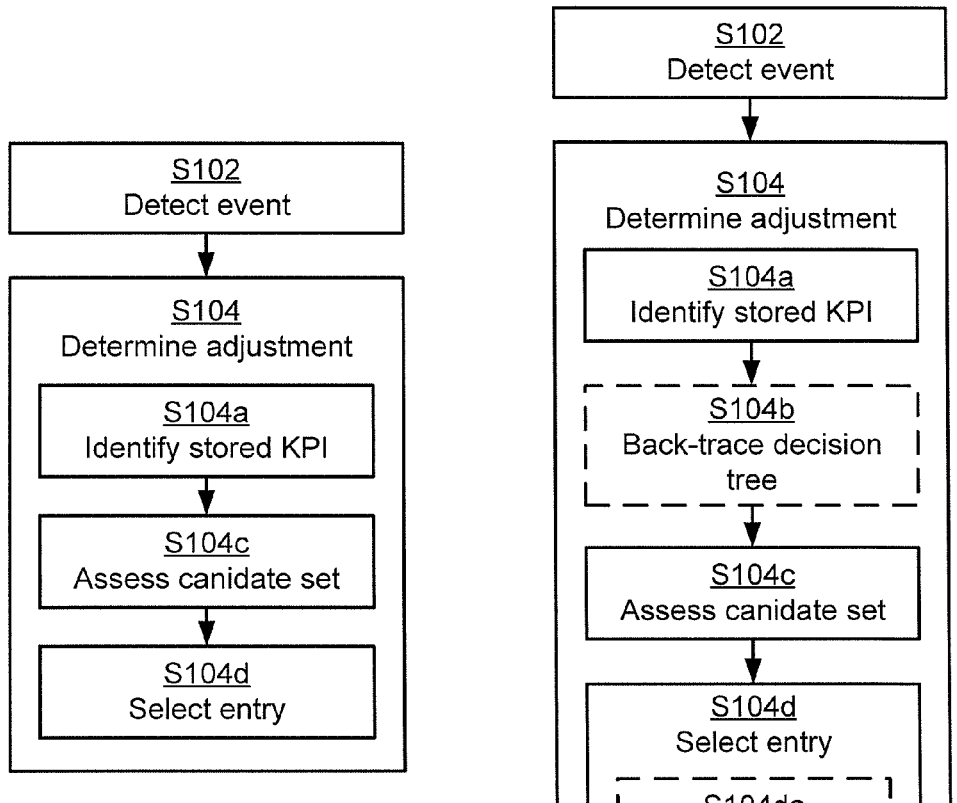
FIGS. 4 and 5 are flowcharts of methods according to embodiments.
Figure 5:
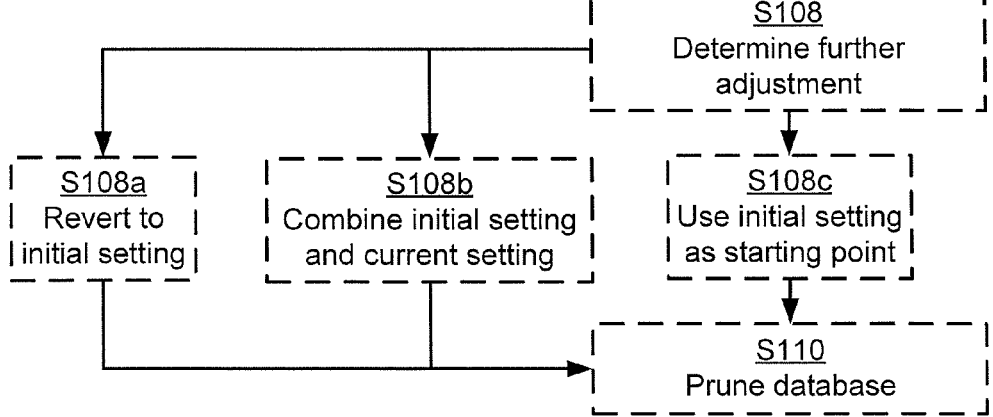

FIGS. 4 and 5 are flow chart illustrating embodiments of methods for determining antenna setting associated with at least one network node 110a, 110b, 110c in a wireless communications network 100a, 100b. The methods are performed by the network node 110a, 110b, 110c, 120. The methods are advantageously provided as computer programs 320.

Reference is now made to FIG. 4 illustrating a method for determining antenna setting associated with at least one network node 110a, 110b, 110c in a wireless communications network 100a, 100b as performed by a network node 110a, 110b, 110c, 120 according to an embodiment.

The network node 110a, 110b, 110c, 120 is configured to, in a step S102, detect an event of a network node in the wireless communications network. The event indicates a need for adjustment of at least one antenna setting of the network node and/or at least one other network node in the wireless communications network 100a, 100b. Examples of events and how they may be detected will be further disclosed below.

The network node 110a, 100b, 110c, 120 is configured to, in a step S104, determine the adjustment of the at least one antenna setting. Particularly, the network node 110a, 110b, 110c, 120 is configured to perform a number of actions, or steps to determine the adjustment of the at least one antenna setting. These actions, or steps, will be disclosed next.

In general terms, at least some of the herein disclosed embodiments are based on logging network key performance information (KPI) that may or may not be of main importance for RAS-SON to achieve its core purpose, but that still may provide insight to how to mitigate or solve possible network abnormalities. KPI and related antenna parameter settings that were obtained historically can be used for rapidly determining suitable antenna settings when the network experiences events. The network node 110a, 110b, 110c, 120 is therefore configured to, in a step S104a, identify stored key performance information based on the event.

The KPIs and the related antenna parameter settings may have been obtained historically when evaluating different antenna settings during an antenna optimization process. Hence, there may be multiple KPIs (possibly more than needed for the regular RAS-SON operation) that are stored and evaluated. The network node 110a, 110b, 110c, 120 is particularly configured to, in a step S104c, assess a candidate set of possible antenna settings of the network node and/or the at least one other network node. The candidate set is defined by the key performance information. In this respect, assessing a candidate set of possible antenna settings may involve evaluating the candidate set of possible antenna settings to determine which of the candidate set of possible antenna settings provides the best network performance, according to some criterion (such as network throughput, cell throughput, user throughput, quality of service, etc.).

The network node 110a, 110b, 110c, 120 is further configured to, in a step S104d, select one entry of antenna settings in the candidate set based on the assessing. This one entry, defining the adjustment, is the determined antenna setting.

Information of network performance as a function of antenna settings that can be obtained historically and from antenna optimization evaluations is thereby used to determine a rapid adjustment of antenna parameters when an unusual situation occurs in the network. For example, this enables negative consequences from a cell outage to quickly be remedied with a change of antenna parameters in nearby, working, RANNs.

In general terms, at least some of the herein disclosed embodiments are applicable for a network, or a part of a network, employing RAS-SON to sequentially update the antenna settings of one or more network nodes in order to increase the overall system performance. One example is a network employing RAS-SON with the purpose of tuning antenna settings in order to increase the cell edge user throughput.

As noted above, it may be difficult for the RAS-SON to beforehand assess how an antenna setting influences the end user performance. Thus, many state-of-the-art RAS-SON algorithms evaluate candidate network settings and keep only a very small set of network settings (e.g., all settings yielding a network performance higher than some threshold, or even the single best setting). One setting that may deteriorate performance is for example a setting that creates too much overlap between cells. This increases the interference and thus lowers the performance of the wireless devices 130 in the overlap area. Such a scenario is shown in FIG. 1b, where cell 140a' and cell 140c' would cause interference to cell 140b and at least cell 140a' would cause interference to wireless device 130, assuming that wireless device 130 is served by cell 140b. Thus, a better setting would be to use cell 140a instead of cell 140a' which decreases the overlap and increases the overall system performance. However, in a scenario where RANN 110b for some reasons stops working and cell 140b thus disappears, cells 140a' and 140c' may be preferred since RANNs 110a and 110c are then capable of covering parts of cell 140b, hence decreasing the overall lack of coverage.

Embodiments relating to further details of determining antenna setting associated with at least one network node 110a, 110b, 110c in a wireless communications network 100a, 100b will now be disclosed.

There may be different examples of events. For example, the event may pertain to cell outage, network node outage, cell overload, network node overload, cell throughput being below a first threshold, network node throughput being below a second threshold, or any combination thereof. The event may relate to one RANN or several RANNs.

There may be different examples of key performance information. In general terms, the type of key performance information that would be valuable depends on what possible network abnormalities that is sought to be mitigated/combated. For example, the key performance information may be associated with antenna settings of the network node and/or the at least one other network node. The key performance information may indicate network performance of the wireless communications network for the associated antenna settings.

There may be further different examples of key performance information. For example, the key performance information may indicate cell coverage overlap and cell size. For example, in some communications network, such as in long-term evolution (LTE) networks, it is possible for an eNB to tell the served wireless devices to perform Reference Signal Received Power (RSRP) measurements from neighboring eNBs and report the measurements back to an eNB. This provides information about candidate serving cells, but may also serve as information about coverage overlap and possible interferers. One suitable type of key performance information to store is the number of wireless devices 130 that report other cells with high received power. Another suitable type of key performance information to store is the power levels that are reported from the wireless devices 130. In this respect, the key performance information may thus describe the impact on the communications network for using a certain set of antenna parameters.

An additional type of key performance information suitable for coping with cell outages is the number of wireless devices 130 served by each cell. If a certain cell goes down, the (previously evaluated) antenna settings with the fewest number of wireless devices 130 served by this certain cell represents a network setting that has a high probability of minimizing the impact of the outage. Combinations of different types of key performance information may also be used, e.g. the number of wireless devices 130 served by the cell in outage can be combined with the general network performance, or with the number of wireless devices 130 in the cell in outage that also reported hearing other cells.

For example, the key performance information may pertains to cell coverage, cell coverage overlap, size of cell coverage area, antenna beam pointing direction, number of wireless devices served by cell, number or wireless devices served by cell affected by said event, power level of wireless device in cell, reports from wireless devices in cell relating to received power from other cell, number of wireless devices in cell reporting received power higher from other cell, or any combination thereof.

There may be different examples of antenna settings. For example, the at least one antenna setting may relate to vertical beam pointing direction, horizontal beam pointing direction, beam width, or any combination thereof. Hence the antenna settings may be one-dimensional, two-dimensional, or three-dimensional.

Reference is now made to FIG. 5 illustrating methods for determining antenna setting associated with at least one network node 110a, 110b, 110c in a wireless communications network 100a, 100b as performed by a network node 110a, 110b, 110c, 120 according to further embodiments.

A database may store historical measurements as key performance information. The database may later be assessed by the network node in case of a network event. In this respect, assessing the candidate set of possible antenna settings may involve the network node to evaluate relevant network states as defined by key performance information stored in the database so as to determine which at least one antenna setting to use.

To better explain how the operation of a RAS-SON scheme may be extended according to embodiments as disclosed herein, a typical RAS-SON operation as well as an event represented by a cell outage will be described.

Figure 6A:
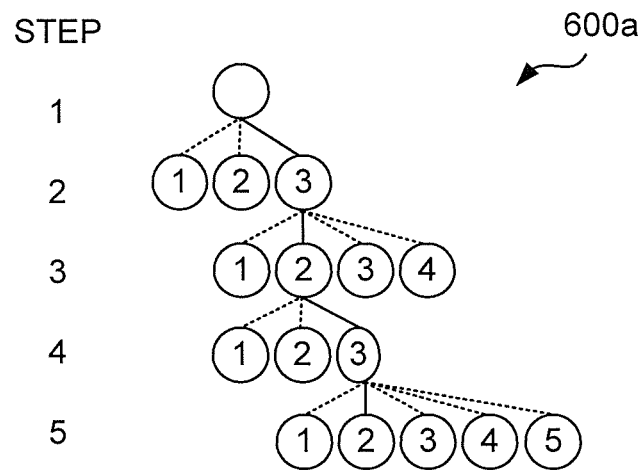
FIGS. 6a, 6b, and 6c schematically illustrate a decision tree process according to embodiments.
Figure 6B:
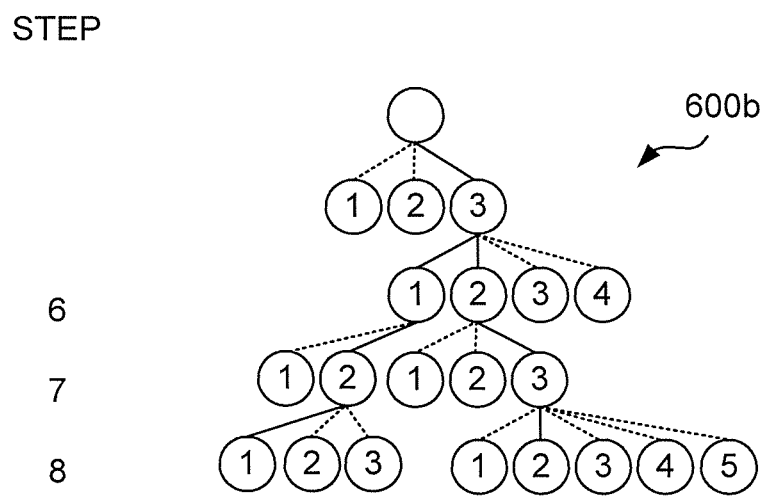
Figure 6C:
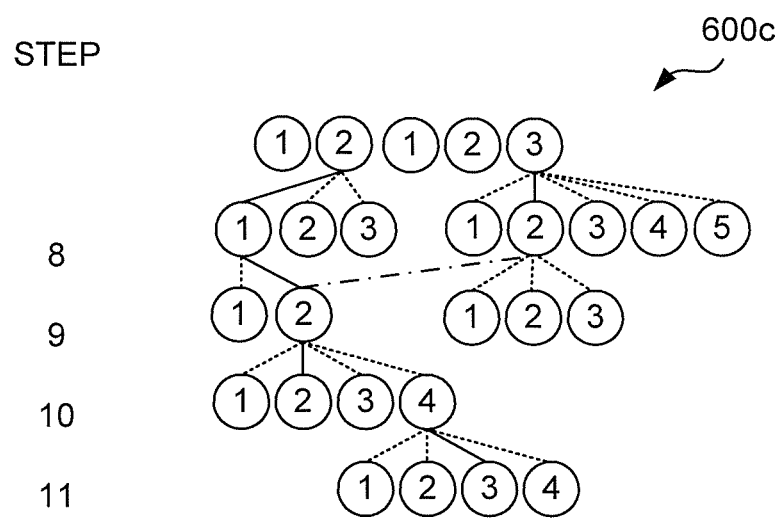
Figure 7:
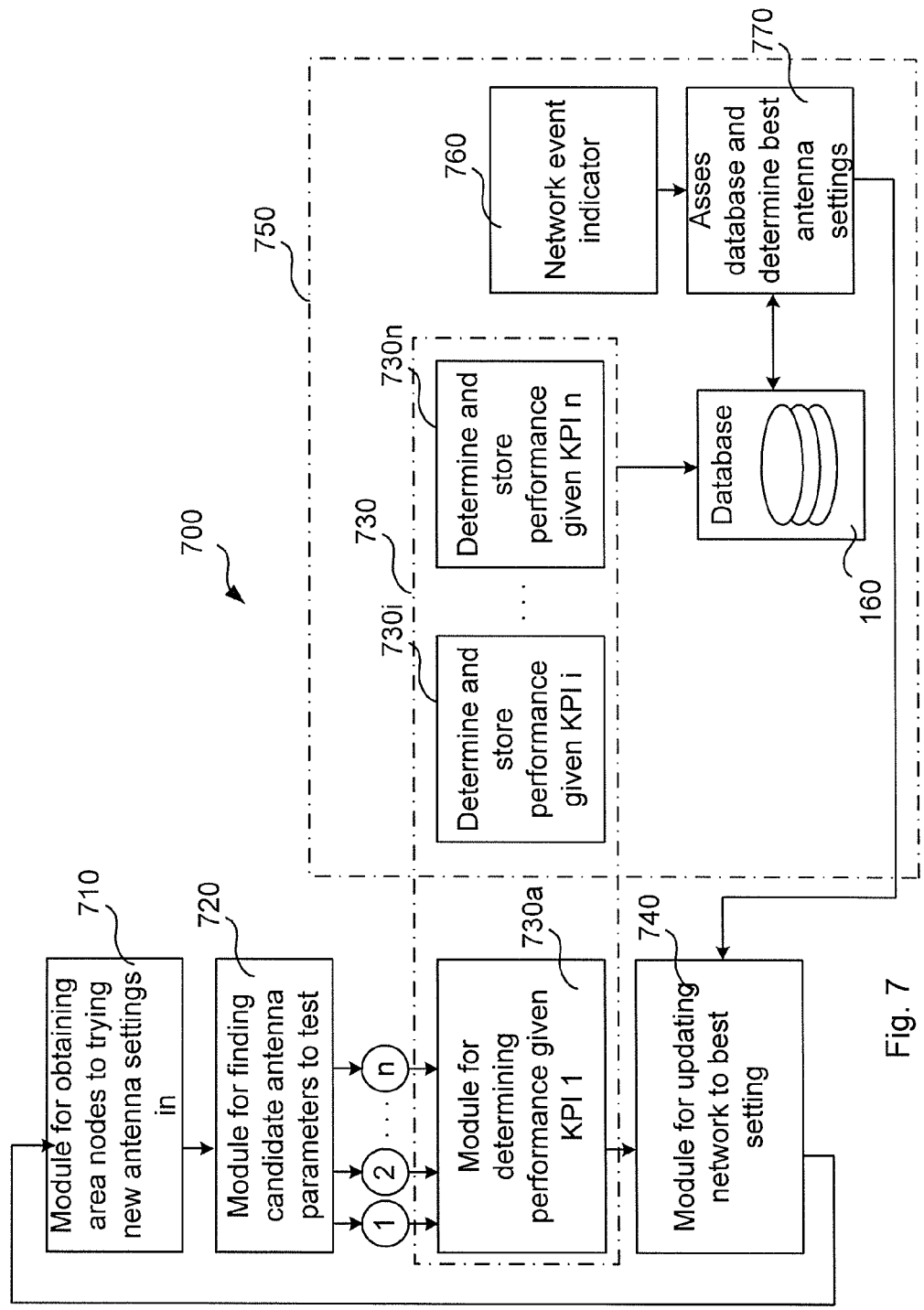
FIG. 7 schematically illustrates a diagram according to an embodiment.

Consider the schematic diagram 700 of FIG. 7 comprising modules 710, 730a, and 740 representing modules of a RAS-SON scheme. To limit the problem of antenna optimization, it is in RAS-SON schemes typical to isolate a smaller area where the RAS-SON scheme operates at each time, see module 710. For the limited area, a set of candidate parameter settings is determined, see module 720. Later all these candidate settings (1, 2, . . . , n) are tested, and the performance are evaluated, module 730a. The encircled numbers 1, 2, . . . , n in FIG. 7 indicate the different antenna settings that are tried, and correspond to the circles in FIGS. 6a-6c, see below. Given the best setting evaluated the network is updated, module 740.

In addition to the RAS-SON scheme, which may operate according to state of the art, the herein disclosed embodiments are indicated by modules 730, 730i, . . . , 730n, 750, 760, 770, and the use of module 1. For example, the key performance information may be obtained from testing a plurality of antenna settings (according to modules 730a, 730i, . . . , 730n) during at least one optimization procedure (according to module 730). A plurality of key performance information values resulting from the at least one optimization procedure may then be stored (in database 160) to form the stored key performance information. Further, not only the key performance information values as such may be stored in the database 160 but also auxiliary information describing why antenna settings associated with the key performance information values were discarded during the optimization procedure. Such auxiliary information may represent events in the communications network. The auxiliary information may thus be used so as to enable the network node to quickly find antenna settings for a particular event. For example, antenna settings associated with cell 110a' may be stored with information indicating that these antenna settings cause interference in cell 110b. Appropriate antenna settings for an event defined by cell 110b down may thus be found by searching for antenna settings causing interference in cell 110b. The database 160 may thus be assessed once an event occurs, for example in case of a network abnormality, to increase speed and stability of the RAS-SON scheme.

As more and more key performance information is stored in the database 160 the number of associated legacy antenna settings may become large. Pruning of the logged key performance information may therefore be considered. Hence, the network node may be configured to, in a step S110, prune the database 160 so as to reduce amount of stored key performance information. The pruning may be based on time or other appropriate metrics. That is, the pruning may be time based or event based.

A separate optimization procedure may be used for obtaining each type of key performance information. For example, in FIG. 7 an optimization procedure with a first objective function may be used for determining the performance in module 730a, an i:th objective function may be used for determining the performance in module 730i, and an n:th objective function may be used for determining the performance in module 730n. Alternatively, the objective function is the same for all different types of key performance information. Once an event is detected by module 760 as in step S102, module 770 may assess the database 160 and determine the at least one antenna setting to use, as in step S104. Hence, multiple types of key performance information (possibly more than needed for the regular RAS-SON operation) may be stored and evaluated. Thereby the network node does not need to perform measurements in order to determine which at least one antenna setting to use; results of such measurements are already available in the database, assuming that a large enough set of key performance information is stored.

The operation of the RAS-SON scheme having been extended according to embodiments as disclosed herein will now be disclosed with reference to a typical RAS-SON operation, as well as an incidence of an event representing a cell outage.

FIG. 6a is an illustrative tree-structure 600a of how a RAS-SON scheme may progress. At each step a number of candidate settings are evaluated. At each step a number of candidate cell/network settings are evaluated (this would correspond to functionality performed by modules 720 and 730 in FIG. 7). For example, at step 1, three settings (1, 2, 3) are evaluated. Out of these settings it is assumed that setting 3 is preferred (given the metric used for the regular operation of the RAS-Son algorithm). Hence step 2 is started from the best network setting obtained from the choices evaluated at step 1. At this step, (which could correspond to another area/node that is up for consideration) there are four candidate settings to evaluate (1, 2, 3, 4), and out of these possible settings, it is assumed that setting number 2 is preferred. This procedure is continued as illustrated in FIG. 6a. The dashed lines indicate evaluated settings, and the solid lines indicate the preferred setting out of the evaluated. Assume thus that step 5 is reached after choosing setting 2 at step 4 and that an event occurs (for example a network outage). Reference is now made to FIG. 6b. FIG. 6b is an illustrative tree-structure 100b of how the herein disclosed embodiments may be used to perform trace back in RAS- SON tree to find the best working point for a communications network that experiences an event. The network node thus assesses the database 160 of KPIs and is assumed to determine that setting 1 in step 2 will result in the smallest outage, and hence the best network performance. When this choice has been made, at least some of the network nodes in the neighborhood of the cell in outage reverts their antenna setting to the setting specified at step 2 (setting 1). From here on the RAS-SON scheme may continue with the cell in outage excluded and stepwise improve the network performance according to steps 4 and 5.

Thus, assuming an embodiment where the at least one antenna setting used when event detected is based on a decision tree, the step of determining the adjustment of the at least one antenna setting may involve the network node 110a, 110b, 110c, 120 to be configured to, in a step S104b, back-trace the decision tree to find a starting point for the determining. The network node 110a, 110b, 110c, 120 may then be configured to, in a step S104da, use the decision tree during the selection of one entry of antenna settings in the candidate set, as in step S104d.

The network node 110a, 110b, 110c, 120 may further be configured to, in a step S106, detect a termination of the event. The network node 110a, 110b, 110c, 120 may then be configured to, in a step S108, determine a further adjustment of the at least one antenna setting in result thereto.

There may be different ways to handle the situation when the event has terminated. Different embodiments relating thereto will now be described in turn. These different embodiments are based on the network node and/or at least one other network node being associated with an initial at least one antenna setting when the event is detected.

FIG. 6c is an illustrative tree-structure 600c of how the herein disclosed embodiments may be used to continue from the scenario where a network node that has experienced an event returns to normal working conditions. For example, when the cell that was in outage (at step 5 in FIG. 6a) is working properly again (at step 9 in FIG. 6c) there are different possibilities where to continue from.

The at least one antenna setting that is currently used, i.e. setting 1 from step 7 in FIG. 6b, as well as the setting the network node affected by the event may be used. This renders the trial setting 1 when going from step 8 to 9 in FIG. 6c. Hence, according to a first embodiment the network node 110a, 110b, 110c, 120 is configured to determine the further adjustment by, in a step S108a, reverting to the initial at least one antenna setting.

Another possibility is to use the setting that is currently used, i.e. setting 1 from step 7 in FIG. 6b, as well as the setting the network node affected by the event had in previous steps that mimics the properties of the current network setting. This could for example be a setting used in any of steps 1-5 in FIG. 6a. This candidate setting is highlighted by setting 2 when going from step 8 to 9 in FIG. 6c. Hence, according to a second embodiment the network node 110a, 110b, 110c, 120 is configured to determine the further adjustment by, in a step S108b, combining the initial at least one antenna setting with at least one antenna setting used during occurrence of the event.

Yet another possibility is to use the setting that was used prior to the event and the candidate settings that the RAS-SON scheme would have chosen as next steps from there. This would render the trial settings 3-5 when going from step 8 to 9 in FIG. 6c. Hence, according to a third embodiment the network node 110a, 110b, 110c, 120 is configured to determine the further adjustment by, in a step S108c, using the initial at least one antenna setting as a starting point for the further adjustment. When the best setting has been found the RAS-SON scheme may continue as usual from step 9 and forward.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method for determining antenna settings associated with one or more network nodes in a wireless communications network, the method comprising:
   detecting an event in the wireless communications network, the event indicating a need for adjustment of at least one antenna setting of said one or more network nodes in the wireless communications network; and
   determining said adjustment of said at least one antenna setting by:
   identifying stored key performance information based on the event;
   assessing a candidate set of possible antenna settings of said one or more network nodes, wherein the candidate set is defined by the key performance information, wherein the key performance information is obtained from testing at least one of the antenna settings during at least one optimization procedure, and wherein at least one of key performance information values resulting from the at least one optimization procedure are stored to form said stored key performance information; and
   selecting one entry from the candidate set of antenna settings based on said assessing, said one entry defining said adjustment, to be the determined antenna setting.

2. The method according to claim 1, wherein the key performance information is associated with antenna settings of said one or more network nodes.

3. The method according to claim 2, wherein the key performance information indicate network performance of the wireless communications network for the associated antenna settings.

4. The method according to claim 1, wherein the at least one antenna setting used when the event detected is based on a decision tree, and wherein determining said adjustment of said at least one antenna setting comprises:
   back-tracing the decision tree to find a starting point for said determining; and
   using said decision tree during said selecting one entry of antenna settings in the candidate set.

5. The method according to claim 1, further comprising:
   detecting a termination of said event; and
   determining, as a result of the detecting of the termination of aid event, a further adjustment of said at least one antenna setting.

6. The method according to claim 5, wherein said one or more network nodes is associated with an initial at least one antenna setting when said event is detected, and wherein determining said further adjustment comprises:
   reverting to said initial at least one antenna setting.

7. The method according to claim 5, wherein said one or more network nodes is associated with an initial at least one antenna setting when said event is detected, and wherein determining said further adjustment comprises:
   combining said initial at least one antenna setting with at least one antenna setting used during occurrence of said event.

8. The method according to claim 5, wherein said one or more network nodes is associated with an initial at least one antenna setting when said event is detected, and wherein determining said further adjustment comprises:
using said initial at least one antenna setting as a starting point for said further adjustment.

9. The method according to claim 1, wherein the stored key performance information is stored in a database, the method further comprising:
pruning said database so as to reduce an amount of stored key performance information.

10. The method according to claim 9, wherein said pruning is time based or event based.

11. The method according to claim 1, wherein key performance information pertains to at least one of cell coverage, cell coverage overlap, size of cell coverage area, antenna beam pointing direction, number of wireless devices served by cell, number or wireless devices served by cell affected by said event, power level of wireless device in cell, reports from wireless devices in cell relating to received power from other cell, number of wireless devices in cell reporting received power higher from other cell.

12. The method according to claim 1, wherein the event pertains to at least one of cell outage, network node outage, cell overload, network node overload, cell throughput being below a first threshold, and network node throughput being below a second threshold.

13. The method according to claim 1, wherein the at least one antenna setting relates to at least one of vertical beam pointing direction, horizontal beam pointing direction, and beam width.

14. A network node for determining antenna settings associated with one or more network nodes, the network node comprising processing circuitry, the processing circuitry being configured to cause the network node to perform a set of operations comprising:
detecting an event in a wireless communications network, the event indicating a need for adjustment of at least one antenna setting of said one or more network nodes in the wireless communications network; and
determining said adjustment of said at least one antenna setting by:
identifying stored key performance information based on the event;
assessing a candidate set of possible antenna settings of said one or more network nodes, wherein the candidate set is defined by the key performance information, wherein the key performance information is obtained from testing at least one of the antenna settings during at least one optimization procedure, and wherein at least one of key performance information values resulting from the at least one optimization procedure are stored to form said stored key performance information; and
selecting one entry from the candidate set of antenna settings based on said assessing, said one entry defining said adjustment, to be the determined antenna setting.

15. The network node according to claim 14, further comprising a storage medium storing said set of operations, and wherein the processing circuitry is configured to retrieve said set of operations from the storage medium to cause the network node to perform said set of operations.

16. The network node according to claim 14, wherein said set of operations is provided as a set of executable instructions.

17. The network node according to claim 14, wherein the network node and the at least one other network node are radio access network nodes.

18. A computer program for determining antenna setting associated with one or more network nodes, the computer program comprising computer code which, when run on processing circuitry of a network node, causes the network node to:
detect an event in a wireless communications network, the event indicating a need for adjustment of at least one antenna setting of said one or more network nodes in the wireless communications network; and
determine said adjustment of said at least one antenna setting by:
identify stored key performance information based on the event;
assess a candidate set of possible antenna settings of said one or more network nodes, wherein the candidate set is defined by the key performance information, wherein the key performance information is obtained from testing at least one of the antenna settings during at least one optimization procedure, and wherein at least one of key performance information values resulting from the at least one optimization procedure are stored to form said stored key performance information; and
select one entry from the candidate set of antenna settings based on said assessing, said one entry defining said adjustment, to be the determined antenna setting.

19. A computer program product comprising a computer program according to claim 18, and a non-transitory computer readable medium on which the computer program is stored.

* * * * *